Patented Apr. 1, 1952

2,591,077

UNITED STATES PATENT OFFICE 2,591,077

METHOD OF PRODUCING A THERMOPLASTIC CELLULOSE ACETATE COMPOSITION

Bayard T. Lamborn, Matawan, N. J., assignor to Hercules Powder Company, Wilmington, Del., a corporation of Delaware No Drawing. Application April 12, 1951, Serial No. 220,733

3 Claims. (Cl. 106—196)

This invention relates to a method for producing thermoplastic cellulose acetate compositions. In a specific aspect this invention relates to a method for producing a thermoplastic composition containing cellulose triacetate in an amount within the range of 10 to 50%.

Cellulose triacetate scrap such as that used in photographic film has heretofore been recovered by solution processes for re-use in films, or it has been dissolved in organic solvents such as acetic acid and subjected to hydrolysis conditions for conversion to a secondary acetate which is then directly useful for conversion to plastics. Cellulose triacetate scrap is not thermoplastic in the commonly accepted sense of the term and has, therefore, not been considered to be useful as a plastic in thermoplastic compositions or to be compoundable into a thermoplastic cellulose acetate molding composition in the usual solventless mixing procedures commonly used for secondary cellulose acetate compositions.

Now in accordance with the present invention, it has been found that a homogeneous thermoplastic cellulose acetate molding composition containing cellulose triacetate in an amount up to about 50% of the total cellulose acetate in the composition and colloided therewith is produced by kneading a colloided secondary cellulose acetate of thermoplastic properties under heat and pressure in the absence of volatile solvents while gradually adding thereto plasticized cellulose acetate of high combined acetic acid content in the form of particles which have been softened or swelled with additional plasticizer so as to have a gradually decreasing plasticizer content from the surface inwardly, and continuing the kneading until a uniformly and homogeneously colloided plastic mass is obtained. The thermoplastic cellulose acetate composition so obtained is useful for extrusion and injection molding.

The following examples illustrate the manner in which the process of this invention is carried out and show properties of a typical plastic composition obtained. All parts and percentages unless otherwise noted are parts by weight.

Example I

Cellulose triacetate scrap motion picture film base from which the emulsion layer and subbing layer had been removed was run through a bath of diethyl phthalate with wiping blades to spread a thin coating of plasticizer on each side. The film was then rolled and stored at 100° C. for 1 hour. The resulting film contained besides about 17% triphenyl phosphate plasticizer originally uniformly distributed throughout the film also about 17% diethyl phthalate distributed through the film in greatest concentration near the surface and in gradually diminishing concentration inwardly from the surface. The film was swollen by the plasticizer and the surface was still slightly wet with plasticizer in small areas. Microscopic examinations of a cross section showed a gradual decrease of plasticizer content, as indicated by degree of swelling, inwardly from the surface. Part of this film was cut into strips 3 mm. by 35 mm. by 0.15 mm. for kneading with plasticized secondary cellulose acetate.

A plastic composition containing both cellulose triacetate and secondary cellulose acetate was compounded by kneading 206 parts cellulose acetate flake (53.5% combined acetic acid) with 185 parts diethyl phthalate on a heated (about 150° C.) two-roll mill with differential rolls until a completely colloided mix was obtained. Then 285 parts of the cut strips of treated scrap film swollen with the plasticizer was added in increments of 75 to 100 parts with kneading to a completely colloided and uniformly blended mix between increments. The resulting plastic composition was sheeted from the rolls and comminuted to a molding powder containing 58.3% cellulose acetate and 41.7% plasticizer. Disks and bars were molded in an injection press. The impact strength was 4.3 foot pounds per inch notch, the flow temperature was 163° C. (temperature at which plastic flows one inch in two minutes), and the hardness was 55 (Rockwell R Scale).

When this experiment was repeated with a film cast from a scrap cellulose triacetate solution containing added dimethyl phthalate so that the film contained a total of 34% plasticizer uniformly distributed in the film, the strips of plasticized scrap film did not colloid with the secondary cellulose acetate and appeared to act only as a filler therefor.

Example II

A portion of the film which had been treated at 100° C. for 1 hour for penetration of the plasticizer as in Example I was treated at 100° C. for an additional hour. A cross section of the film showed a more even distribution of the plasticizer in the film and surface scrapings analyzed 50–60% plasticizer. Slivers cut from this film and subjected to compounding by kneading under heat and pressure in the absence of volatile solvent as in Example I gave a plastic composition substantially identical with that of Example I.

Example III

Films which had been cut into slivers and wet with diethyl phthalate in sufficient amount to provide 17% plasticizer in addition to the 17% already distributed in the plasticized scrap film but not allowed to age so as to permit penetration of the additional plasticizer could not be colloided and homogeneously blended with the secondary cellulose acetate-plasticizer composition of Example I employing hot colloiding methods. The slivers appeared to remain in the mass unchanged. The plasticizer on the surface apparently was colloided with the secondary cellulose acetate preferentially in the kneading operation on the hot two-roll mill.

Following the procedure of either Example I or II, up to about 50% by weight cellulose triacetate based on total cellulose acetate can be incorporated into a highly satisfactory and useful thermoplastic molding composition. Heretofore, it has not been considered possible to introduce cellulose triacetate into a colloided plastic mix suitable for molding purposes by a hot colloiding process in the absence of volatile solvents. The present process depends upon the treatment of the cellulose triacetate in such a way that it is highly plasticized near the surface with gradually decreasing plasticizer content toward the center. In this way the process is effected without introduction of so large an amount of plasticizer as to destroy the useful properties of the plastic mass. The cellulose triacetate must contain at least 15% plasticizer as the greatest distance from the surface so that the last portion will colloid and blend uniformly and completely in the mass. Thus, if unplasticized cellulose triacetate is plasticized only with the plasticizer added and without treatment other than aging to bring about diffusion, the plasticizer would have to diffuse sufficiently to bring the plasticizer content to a minimum of 15% at the greatest distance from the surface. In such a treated cellulose triacetate no portion would contain less than 15% plasticizer and the surface would contain substantially more, at least about 45%, and preferably about 50% to 60% plasticizer. Since scrap film already contains 15-20% plasticizer, scrap film is a preferable source of cellulose triacetate. In such scrap film the diffusion of added plasticizer is more readily brought about and the minimum plasticizer content is already present throughout the cellulose triacetate. The added plasticizer is necessary in either case and it must be present in concentrations of at least about 45% and preferably 50% to 60% at the surface with gradual decrease in concentration inwardly from the surface of the film. The total plasticizer should not be less than about 35% of the weight of the plasticizer-treated particle.

The process of this invention is also applicable to cellulose triacetate in forms other than films, such as virgin cellulose triacetate flake, for example; but due to the requirement of gradual decrease in concentration of the plasticizer inwardly from the surface, the size or shape of the cellulose triacetate particles is of some importance. For practical operation, it has been determined that no point in the cellulose triacetate particles should be more than about 0.10 mm. from a surface through which the added plasticizer is to diffuse. Thus, if the particles are of a shape that presents a minimum surface per unit volume, they must be smaller than about 0.10 mm. in radius. However, if the cellulose triacetate consists of open, spongelike particles so as to present a high surface per unit volume, the gross dimensions of the particles may be greater. Scrap film up to about 0.20 mm. thickness is operable but scrap film of 0.15 mm. or less is preferable. The film may be used in long strips but is preferably cut into small strips or slivers to aid in the mixing process. The term "particles" is intended to include strips of film as well as slivers or chips of film, cellulose triacetate flake, and the like.

While the dimensional characteristics of the particles of cellulose triacetate are of importance for the production of a plasticizer-treated cellulose triacetate conditioned for admixing with secondary cellulose acetate by hot colloiding methods, the dimensional characteristics are of less importance after the particles are swollen with plasticizer. Thus the dimensions when swollen may be up to twice that of the unswollen particles. Moreover, the particles may be reduced in overall size after swelling, if desired. For instance, film swollen in coiled strips or sheets may be cut to smaller dimension and be suitable for conversion into a plastic composition; for each particle will have substantially the requirement of high plasticizer concentration at the surface with gradually decreasing concentration inwardly toward a point at the greatest distance from the surface.

Cellulose triacetate within the scope of this invention is considered to be any cellulose triacetate having 59 to 62.5% combined acetate acid, and wherever the term "cellulose triacetate" is used, cellulose acetate of such a range of combined acetic acid content is meant. Scrap film cellulose triacetate generally has a combined acetic acid content in the range of 60 to 62%.

Secondary cellulose acetate used in the process of this invention is cellulose acetate of 52 to 57% combined acetic acid and is the type known to be useful in thermoplastic compositions. Secondary cellulose acetate of 53 to 56% combined acetic acid content is preferred. Either new or scrap secondary cellulose acetate may be used.

The plasticizers useful in the process of this invention include triacetin, triethyl phosphate, dimethyl phthalate, and diethyl phthalate for use as the additional plasticizer for diffusion into the cellulose triacetate particles. The cellulose triacetate to be treated with any of these additional plasticizers may already contain any of the above plasticizers or any plasticizer useful with cellulose triacetate films uniformly colloided therewith. The plasticizer for the secondary cellulose acetate colloided mass to which the cellulose triacetate is added must also be either a plasticizer for cellulose triacetate films or be one of the additional plasticizers listed above. The additional plasticizers are classified as liquid plasticizers completely compatible per se with cellulose triacetate in all proportions. At least 90% of the additional plasticizer should be completely compatible in all proportions with cellulose triacetate and should contain no other components which detract from its compatibility when present in amounts up to about 10%. Besides the plasticizers set forth above, a "plasticizing activator" in amount up to 10% of the plasticizer may be used in admixture with the plasticizer used for treatment of the cellulose triacetate. The use of such a plasticizing activator aids in the penetration or diffusion of the plasticizer into the cellulose triacetate. The materials which have been found to function as plasticizing activators are: the liquid water-soluble glycols and polymers thereof containing only carbon, hydrogen, and oxygen and boiling within the range of about 195° to 300° C. This includes ethylene glycol, propylene glycol, and polymers thereof such as di- and tri-ethylene glycols and di- and tri-propylene glycols, and the like. These glycols improve the plasticizing action and do not detract from the cellulose acetate plasticizers when present therein in amounts up to about 10% of the total plasticizer.

The aging of the cellulose triacetate with plasticizer is generally accomplished at elevated temperature to shorten the time required. Temperatures of 60-100° C. are suitable, but temperatures up to about 200° C. may be used, if desired.

Kneading may be accomplished on a two-roll mill, a Banbury mixer, a plastic extruder, or similar hot colloiding and kneading apparatus.

The kneading temperature must be sufficient to make kneading possible. The minimum temperature is generally about 150° C. The maximum temperature will be that below which decomposition takes place and will in general be below about 300° C.

The amount of plasticizer used in the process of this invention will be governed by the characteristics of the materials used and the properties desired. Secondary cellulose acetate will require at least about 20% plasticizer and preferably 25 to 30% plasticizer for satisfactory kneading as the cellulose triacetate is added and colloided therewith. Since more plasticizer will be required with the cellulose triacetate, it is preferable to keep the amount used with the secondary cellulose acetate low when a low average is desired in the finished plastic. The cellulose triacetate should have an average plasticizer content or, as better expressed, total plasticizer content of about 35% plasticizer as a minimum. This, as pointed out above, is to be distributed from the surface inwardly over a range of concentration from at least about 45% at the surface to at least 15% at the point farthest from the surface and may be as high as 100% at the surface. The maximum at the center will depend upon the total that can be allowed for the final composition for the properties desired therein, since operability is not destroyed by a large amount of plasticizer. However, the properties of the finished product will be greatly affected thereby and too high a plasticizer content may limit greatly the utility of the completed product. In general, the final product should contain as much below 50% total plasticizer as possible and the actual amount that can be used will depend upon the amount of cellulose triacetate incorporated and the minimum amount of plasticizer that can be used therewith. Up to about 50% cellulose triacetate based on total cellulose acetate in the composition can be tolerated in a finished plastic composition containing cellulose triacetate and secondary cellulose acetate. The minimum plasticizer content of such a composition produced by this process would thus have slightly less than about 30% plasticizer. The desired range would be about 35%. Higher plasticizer contents are much more easily obtained simply by kneading in more plasticizer into the composition during the compounding process if more plasticizer is desired.

The plastic compositions of this invention are useful for coating fabrics and other materials and for general molding purposes where secondary cellulose acetate compositions are useful. The advantage of the process is that it makes use of scrap film which has heretofore required solvents for direct utilization and has generally involved removal of the plasticizer and subsequent hydrolysis to a usable secondary cellulose acetate.

What I claim and desire to protect by Letters Patent is:

1. The method of producing a thermoplastic cellulose acetate composition containing cellulose triacetate in an amount within the range of about 10 to 50% which comprises kneading secondary cellulose acetate plasticized with about 20% to about 30% plasticizer therefor at an elevated temperature below the temperature of decomposition thereof while gradually adding thereto particles of cellulose triacetate, said particles being permeated with plasticizer in concentration varying from at least about 45% at the surface thereof to about 15 to 20% at the greatest distance from the surface, and continuing kneading until a uniformly colloided plastic mass is obtained.

2. The method of producing a thermoplastic cellulose acetate composition containing cellulose triacetate in an amount within the range of about 10 to 50% which comprises kneading secondary cellulose acetate plasticized with about 20% to about 30% plasticizer therefor at an elevated temperature below the temperature of decomposition thereof while gradually adding thereto particles of cellulose triacetate, said particles being colloided with at least 15% plasticizer and softened with additional plasticizer distributed in gradually decreasing concentration inwardly from at least about 45% at the surface thereof to about 15 to 20% at the greatest distance from a surface, and continuing kneading until a uniformly colloided plastic mass is obtained.

3. The method of producing a thermoplastic cellulose acetate composition containing cellulose triacetate in an amount within the range of about 10 to 50% which comprises kneading secondary cellulose acetate plasticized with about 20% to about 30% plasticizer therefor at an elevated temperature below the temperature of decomposition thereof while gradually adding thereto particles of cellulose triacetate, said particles being colloided with at least 15% plasticizer and softened with additional plasticizer distributed in gradually decreasing concentration inwardly from about 50 to 60% at the surface thereof to about 15 to 20% at the greatest distance from a surface, and continuing kneading until a uniformly colloided plastic mass is obtained.

BAYARD T. LAMBORN.

REFERENCES CITED

The following references are of record in the file of this patent:

UNITED STATES PATENTS

| Number | Name | Date |
| --- | --- | --- |
| 1,910,948 | Dreyfus | May 23, 1933 |
| 1,953,956 | Dreyfus | Apr. 10, 1934 |
| 1,999,405 | Dreyfus | Apr. 30, 1935 |

FOREIGN PATENTS

| Number | Country | Date |
| --- | --- | --- |
| 417,937 | Great Britain | Oct. 11, 1934 |